(12) United States Patent
Lee et al.

(10) Patent No.: US 6,803,340 B2
(45) Date of Patent: Oct. 12, 2004

(54) CATALYST FOR REMOVING DIOXIN AND PREPARATION METHOD THEREOF

(75) Inventors: Sang-Ho Lee, Taejon (KR); Jun-Seong Ahn, Taejon (KR); Jong-Hyun Kim, Taejon (KR); Bong-Jea Kim, Taejon (KR)

(73) Assignee: SK Corporation, Seoul (KR)

( * ) Notice: Subject to any disclaimer, the term of this patent is extended or adjusted under 35 U.S.C. 154(b) by 243 days.

(21) Appl. No.: 10/007,572

(22) Filed: Dec. 5, 2001

(65) Prior Publication Data
US 2002/0111268 A1 Aug. 15, 2002

(30) Foreign Application Priority Data
Dec. 16, 2000 (KR) ......................................... 2000-77557

(51) Int. Cl.[7] .............................................. B01J 23/00
(52) U.S. Cl. ...................... 502/309; 502/312; 502/315; 502/351
(58) Field of Search .......................... 502/309, 312, 502/315, 316, 322, 323, 327, 332, 335, 336, 337, 338, 351, 354, 355, 415, 439, 22, 28, 105, 113, 209, 210, 211, 213, 214, 219–222, 242, 248, 255, 259, 27; 423/150.2, 625, 628, 658.5

(56) References Cited

U.S. PATENT DOCUMENTS 4,207,169 A * 6/1980 Courty et al. ............... 208/124
4,490,483 A * 12/1984 Vogel et al. ................. 502/309
4,602,000 A * 7/1986 Dupin et al. ................ 502/335
4,666,685 A * 5/1987 Wiewiorowski ............. 423/55
4,861,565 A * 8/1989 Sefton et al. ................ 423/55
5,783,515 A    7/1998 Sakurai et al. .............. 502/207
5,827,489 A * 10/1998 Garcin et al. .............. 423/239.1
6,171,566 B1 * 1/2001 Ku et al. .................... 423/239.1
6,602,818 B2 * 8/2003 Choi et al. .................. 502/220

FOREIGN PATENT DOCUMENTS

| KR | 98019531 | 5/1998 | ............ F23G/5/00 |
| KR | 98019532 | 5/1998 | ............ F23G/5/00 |
| KR | 000041789 | 7/2000 | ........... B01D/53/70 |

* cited by examiner

Primary Examiner—Cam N. Nguyen
(74) Attorney, Agent, or Firm—Abelman, Frayne & Schwab

(57) ABSTRACT

A catalyst for removing dioxin and a preparation method thereof. The catalyst is prepared by recycling a spent catalyst discharged from a hydro-desulfurization process of an oil refinery in which the spent catalyst comprises an alumina support (preferably, gamma alumina) with a large specific surface area impregnated with high contents of vanadium. The spent catalyst is mixed with a tungsten-impregnated titania, whereby a catalyst comprising suitable metal components and a mixture support of alumina and titania may be prepared. The catalyst in accordance with the present invention has excellent dioxin removal performance and low preparation cost because of recycling the spent catalyst.

15 Claims, 1 Drawing Sheet

CATALYST FOR REMOVING DIOXIN AND PREPARATION METHOD THEREOF

BACKGROUND OF THE INVENTION

1. Field of the Invention

The present invention relates, in general, to a catalyst for removing dioxin. More specifically, the present invention relates to a catalyst having high removal efficiency of dioxin, which is prepared by recycling an alumina-based spent catalyst discharged from a hydro-desulfurization process of an oil refinery.

2. Description of the Prior Art

Exhaust gases generated, for example, from incineration facilities for disposing of industrial wastes and municipal wastes, steel-making plants and metal refining industries, contain trace amounts of toxic organic chloro-compounds, such as dioxins, PCB and chlorophenol, in addition to harmful substances, such as sulfur oxides ($SO_x$), nitrogen oxides ($NO_x$), and chlorine.

Dioxins, known to be poisonous substances, which cause various cancers and birth defects, are generated when chemical wastes containing dioxin precursors, such as municipal wastes and medical wastes, are incinerated in incinerators such as refuse furnaces and recycling facilities. The substances referred to as dioxins are grouped into dioxin-based compounds (PCDD: polychlorinated dibenzo-p-dioxin), in which two benzene rings containing two replaced chlorine atoms are connected through two oxygen atoms, and furan-based compounds (PCDF: polychlorinated dibenzofuran) which is connected through one oxygen atom. Dioxins include their isomers which include as many as 75 types for dioxin-based compounds and 135 types for furan-based compounds depending on the position and the number of replaced chlorine atoms. In other words, a total of 210 dioxin compounds are present. Among them, 2,3,7,8-TCDD is known as the most toxic substance versus the human body and the environment, remaining in the human body and the environment for a long time. Further, since dioxins are highly stable water-insoluble substances and their toxicity is substantially permanent, they are considered to be the most significant chemical substance that causes environmental pollution. It is reported that formation of dioxins depends on temperature, chlorine (HCl, $Cl_2$) concentrations, oxygen and carbon monoxide concentrations on incineration and thermal treatment. Dioxins are formed in a maximum amounts at 250–450° C. in de novo synthesis, but decomposed at 600° C. or higher.

Dioxins generated from incinerators can be treated in two manners: a pre-treatment technique and a post-treatment technique. In case of the pre-treatment technique, dioxin discharge may be reduced through previous separation of wastes, structure alteration of combustor and optimization of combustion conditions but its generation cannot be totally prevented. In view of foregoing, the synthesized dioxins may be effectively removed through the post-treatment technique in combination with the pre-treatment technique.

In case of the post-treatment technique, dioxins generated from treatment of exhaust gas and/or combustion are removed before being discharged to the atmosphere. These techniques classified into, for example a catalytic oxidation-decomposition, a thermal-incineration and decomposition, an adsorption-separation and so on. As for the catalytic oxidation-decomposition, exhaust gas contacts with catalyst such that dioxins are decomposed into substances such as $CO_2$, $H_2O$, HCl and so on. Recently, this technique has been under vigorous study. In a thermal-incineration and decomposition, exhaust gas containing dioxins is re-heated to high temperatures of 1000° C. or higher, thereby decomposing dioxins, and such a technique as mainly controls combustion in the incinerators is disclosed in Korean Patent Laid-Open Nos. 98-019531 and 98-019532. However, said technique suffers from disadvantages of high cost for using energy and installing equipments, and also re-synthesis of dioxins during cooling after thermal-decomposition. So, this method is mainly used in treatment of ashes from the incinerators.

The adsorption-separation, which causes dioxin compounds to be adsorbed and removed by contacting exhaust gas with adsorbents may generate secondary pollutants due to recycling of adsorbents and treating of spent adsorbents. In this regard, Korean Patent Laid-Open No. 2000-41789 discloses a method for removing dioxins, in which dioxins are adsorbed and removed using polyethylene (PE) or polypropylene (PP) as adsorbents at constant temperature and then the used adsorbents are recycled. But, this method has problems as described above.

Meanwhile, through conventional techniques for removing dioxins in exhaust gas, smoke may be removed by a dust-collection of a fountain-form washer mounted to exhaust flues in the incinerators but dioxins adsorbed from discharge gas are not completely removed. Accordingly, such methods are rarely used.

Among post-treatment techniques, the catalyst oxidation-decomposition method in which transition metal compounds ($TiO_2$, $V_2O_5$, $WO_3$, $Cr_2O_3$, $Co_3O_4$, $CuCr_2O_4$) or noble metals (Pt, Pd) are used is most advantageous in terms of removal efficiency of dioxin. In this regard, U.S. Pat. No. 5,783,515 refers to a catalyst for removing dioxins prepared by impregnating zeolite with a first catalyst ingredient which is at least one element selected from the group consisting of Pt, Pd, Ir and oxides thereof, and a second catalyst ingredient which is at least one element selected from the group consisting of Au, Ag, Cu, Fe, Sb, Se, Te, Ta and oxides thereof.

However, the noble metals are expensive and also susceptible to poisoning by chlorine, thus transition metals being more widely used instead of them. In particular, in practical dioxin-decomposition processing, $Pt/Al_2O_3$-cordierite, $V_2O_5$—$WO_3/TiO_2$ monolith, $TiO_2$ monolith and the like are used as catalysts. Therefore, useful as conventional catalyst for removing dioxins is a catalyst comprising a titanium oxide support impregnated with active metals, such as vanadium, tungsten and so on. However, a catalyst for removing dioxins, which has high decomposition activity versus dioxins, and excellent heat stability and poisoning resistance has not been developed yet. In addition, conventionally used titanium oxide, vanadium and tungsten are too expensive and thus economic burden may occur. Accordingly, a novel method for removing dioxin having more efficient and economic removal activity of dioxin is required.

SUMMARY OF THE INVENTION

Leading to the present invention, the intensive and thorough research on a spent catalyst discharged from a hydro-desulfurization process of an oil refinery, carried out by the present inventors aiming to avoid the problems encountered in the prior arts, resulted in the finding that a spent catalyst comprising an alumina support (preferably gamma alumina) with a large specific surface area impregnated with high contents (5 wt % or higher) of vanadium may be recycled to prepare a catalyst for removing dioxin. The spent catalyst is mixed with a tungsten-impregnated titania support to re-distribute the excess metal components contained therein into the tungsten-impregnated titania support. The thusly prepared catalyst may be used as a dioxin removal catalyst, which has high removal efficiency versus dioxin, thus incurring economic benefits.

Therefore, it is an object of the present invention to provide a catalyst having high removal efficiency of dioxin.

It is another object of the present invention to provide a method for preparing a dioxin removal catalyst, which may incur economic benefits by using a spent catalyst discharged from a hydro-desulfurization process of an oil refinery.

In accordance with one aspect of the present invention, there is provided a catalyst for removing dioxin, comprising 1–10 wt % of vanadium, 0.1–5 wt % of nickel, 0.1–5 wt % of molybdenum and 1–15 wt % of tungsten, on a mixture support consisting essentially of 10–50 wt % of alumina and 50–90 wt % of titania.

In accordance with second aspect of the present invention, there is a provided a preparation method of a dioxin removal catalyst, which comprises the following steps of:

a) pretreating a spent catalyst discharged from a hydro-desulfurization process of an oil refinery, which comprises 5–30 wt % of vanadium, 1–10 wt % of nickel, 1–10 wt % of molybdenum, 0.1–5 wt % of iron, 1–10 wt % of sulfur, 0.1–5 wt % of silicon and 0.1–5 wt % of phosphor on an alumina support by thermally treating said spent catalyst followed by washing with water;

b) providing a titania impregnated with 1 to 20 wt % of tungsten;

c) homogeneously mixing the pretreated spent catalyst with the tungsten-impregnated titania under the addition of water and acid;

d) dehydrating the mixture to remove excess moisture and active metal components therein;

e) drying the dehydrated mixture, followed by grinding the dried mixture; and f) forming a catalyst body by extruding the grinded mixture or coating the grinded mixture to a structure, followed by drying and then calcining the dried structure.

BRIEF DESCRIPTION OF THE DRAWING

The above and other objects, features and other advantages of the present invention will be more clearly understood from the following detailed description taken in conjunction with the accompanying drawing, in which.

DETAILED DESCRIPTION OF THE INVENTION

Figure 1:
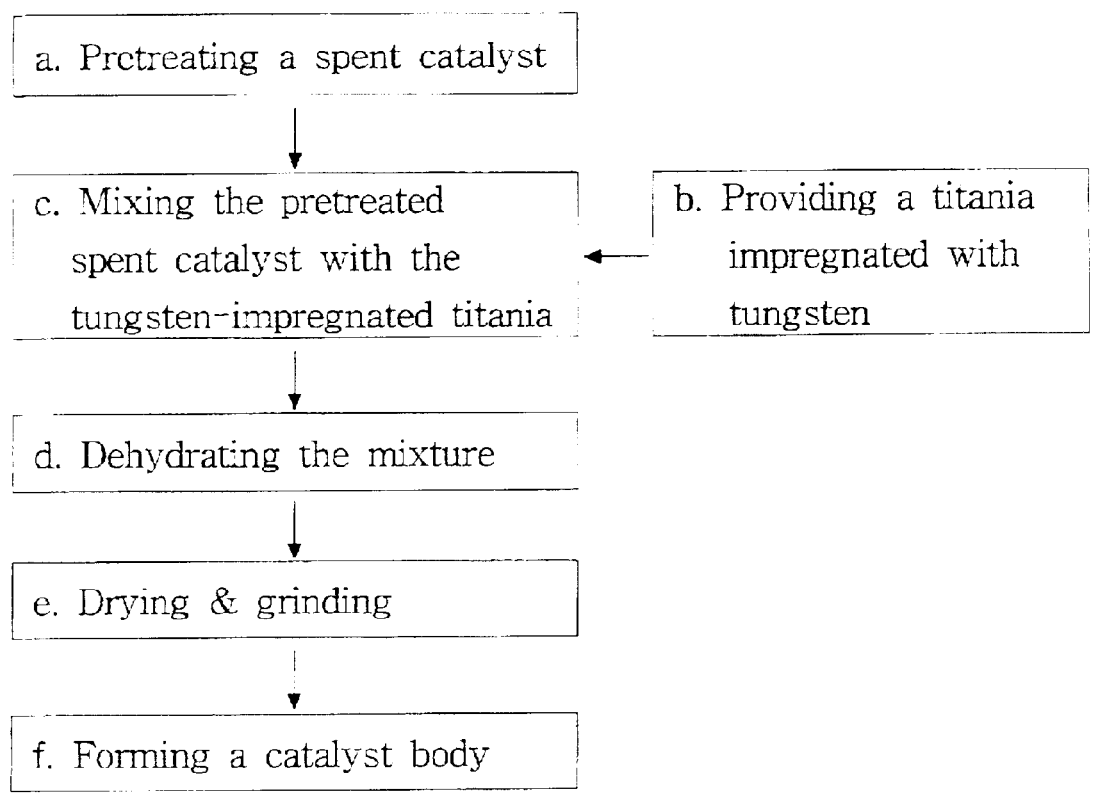
FIG. 1 shows a diagram of a process for preparing a catalyst for removing dioxin using a spent catalyst, according to the present invention.

In accordance with the present invention, use is made of a spent catalyst discharged from a hydro-desulfurization process of an oil refinery, which has relatively high content of vanadium. Such spent catalyst comprises 5–30 wt % of vanadium, 1–10 wt % of nickel, 1–10 wt % of molybdenum, 0.1–5 wt % of iron, 1–10 wt % of sulfur, 0.1–5 wt % of silicon and 0.1–5 wt % of phosphor, on alumina support, preferably gamma alumina support. The spent catalyst also has a specific surface area of 40–100 m$^2$/g and pore sizes of 150–300 Å.

With reference to FIG. 1, there is shown a diagram of a process for preparing a catalyst for removing dioxin using a spent catalyst, according to the present invention.

As seen in FIG. 1, a method for preparing a catalyst for removing dioxin comprises the steps of pretreating a spent catalyst, providing a tungsten-impregnated titania, homogeneously mixing the pretreated spent catalyst with the tungsten-impregnated titania under the addition of water and acid, dehydrating the mixture, drying the dehydrated mixture, followed by grinding the dried mixture, and forming a catalyst body by extruding the grinded mixture or coating the grinded mixture to a structure, followed by drying and then calcining the dried structure.

Generally, during the hydro-desulfurization process, the surface of the spent catalyst is contaminated with oils, and carbon and sulfur are accumulated therein. To eliminate such impurities, the spent catalyst is thermally treated preferably at 300–400° C. for 3–5 hours. At this thermal treatment temperature, carbon and part of sulfur (especially, carbon) may be effectively eliminated. Thereafter, the thermally treated spent catalyst is washed with water to remove sulfur components and excess metal components accumulated in the spent catalyst to a certain extent.

Separately from the above pretreating step, a titania impregnated with tungsten is prepared and provided. The tungsten-impregnated titania is preferably prepared by immersing ammonium meta tungstate soluble in water into a slurry of meta titanic acid, drying and calcining. At that time, the tungsten-impregnated titania has a specific surface area of 60–100 m$^2$/g and pore sizes of 150–200 Å, and has anatase crystalline structure with preference. Further, the tungsten is present at an amount of 1–20 wt % in the tungsten-impregnated titania.

The pretreated spent catalyst and the tungsten-impregnated titania are homogeneously mixed at a weight ratio of 10:90–50:50 under the addition of water and acid. If the amount of the spent catalyst is less than 10 wt %, active metals are deficient in the resulting catalyst and its specific surface area becomes excessively large. On the other hand, when the spent catalyst exceeds 50 wt %, an excess amount of active metals are present in the mixture and its specific surface area becomes too small. While passing through the mixing step, the active metal components contained in the spent catalyst are dissolved out and then homogeneously impregnated to the tungsten-impregnated support.

Said mixing step may be conducted in the following manner. In addition to the mixture, water and acid are introduced into a ball mill and then pulverized and mixed preferably for 2–3 hours to give a mixture in the form of fine powder, in which 2–3 μm particles amount to about 40–60 vol %.

According to the present invention, the acid is used for dissolving excess metal components contained in the spent catalyst. Such dissolved active metals are re-distributed into the tungsten-impregnated titania. In other words, active metal components are dissolved in acids so that the alumina of the spent catalyst has much larger specific surface area and excess active metals are adsorbed into pores in the tungsten-impregnated titania with large specific surface area. As such, the acid should dissolve active metals such as vanadium, nickel, molybdenum and so on. Accordingly, the acid, for example oxalic acid or citric acid, is added at an amount of 3–7 wt % based on the spent catalyst and the tungsten-impregnated titania, depending on contents of metal components contained in the spent catalyst.

As a result of mixing the alumina-based spent catalyst with the tungsten-Impregnated titania, the catalyst of the present invention comprises 1–10 wt % of vanadium, 0.1–5 wt % of nickel, 0.1–5 wt % of molybdenum and 1–15 wt % of tungsten, on a mixture support consisting essentially of 10–50 wt % of alumina and 50–90 wt % of titania.

After mixing, in order to eliminate excess metal components contained in the mixture, dehydrating is conducted, for example by use of a filter press under a high pressure of about 10–15 kg/cm², thereby yielding a dehydrated cake. Through dehydrating, the active metal components are homogeneously distributed in the catalyst of the present invention.

Thereafter, the dehydrated mixture is dried and grinded. Even though the drying and grinding are separately carried out, it is preferred that these steps are simultaneously conducted in terms of a production efficiency of the catalyst. In this case, a continuous dryer-miller is preferably used. That is, the dehydrated cake is introduced into the continuous dryer-miller, thereby grinding the cake into the previously pulverized particle sizes and simultaneously drying the grinded particles. The drying step, in which moisture is removed, is carried out preferably at about 80–120° C. for 0.5–2 hours to primarily impregnate the active metals dissolved in the mixing step onto tungsten-impregnated titania effectively.

The grinded mixture is extrusion molded preferably into honeycomb or coated to a structure to form a catalytic body.

In the case of the extrusion molding, for example the grinded mixture is added with organic binders, inorganic binders, and glass fiber and then mixed under dry conditions. Next, water, plasticizers, lubricants, and dispersants are additionally added thereto, and then aged at 5° C. or lower for about 1–2 days. Thereafter, the aged materials are placed into a kneader and then kneaded 2–5 times such that the components and their strain are homogeneously distributed in the materials. Additionally, said materials are stored at 5° C. or lower for about 1–5 days and then introduced into a vacuum extruder. Thus, an extruded body of honeycomb forms is prepared through the procedures as described above.

Meanwhile, coating the grinded mixture to a structure is preferably carried out in the following manner. Coating materials including the grinded mixture, inorganic binders and water are applied, poured or pressure-adhered to a metal plate of honeycomb forms or a cordierite-typed ceramic honeycomb.

Thereafter, the catalyst body prepared by said extruding or coating method is dried preferably at about 60–120° C. for 3–48 hours by use of apparatuses such as hot blast dryer or microwave dryer, or thermohydrostat in order to remove water used in the preparation thereof. In the case of extruding, non-cracked catalyst body may be prepared by combining the apparatuses as aforementioned.

Thusly dried catalyst body is calcined, preferably at about 450–550° C. for 3–5 hours. Through the calcination, a pore structure and a specific surface area of the mixture support consisting of titania and alumina may be optimized, and active metal components such as vanadium, nickel, molybdenum and tungsten are crystallized in their oxide forms, thereby maximizing the dioxin-removal activity of the catalyst.

In particular, the organic binders, which are added in the extrusion molding, are combusted and thus removed.

A better understanding of the present invention may be obtained in light of the following examples which are set forth to illustrate, but are not to be construed to limit the present invention.

EXAMPLE 1

Activities and Properties of Dioxin-Removing Catalyst (1)

A spent catalyst, deprived of impurities, discharged from a hydro-desulfurization process of oil refinery, was analyzed with respect to its composition by use of XRF and ICP. As a result, it was confirmed that the spent catalyst comprises 15.0 wt % of vanadium, 5.8 wt % of nickel, 4.0 wt % of molybdenum, 1.8 wt % of iron, 5.4 wt % of sulfur, 0.2 wt % of silicon, 0.1 wt % of phosphorous. The spent catalyst was thermally treated at 350° C. for 3 hours, and washed with water.

Ammonium meta tungstate was added to a slurry of meta titanic acid, admixed homogeneously, in which the ammonium meta tungstate was added at an amount of 10 wt % on the basis of the solid weight of the slurry, and thereafter, thermally treated at 500° C. for 3 hours to give a tungsten-impregnated titania having anatase crystalline structure.

Into a ball mill were placed 20 wt % of the pretreated spent catalyst and 80 wt % of the tungsten-impregnated titania, and then 50 wt % of water and 5 wt % of oxalic acid were added thereto based on the spent catalyst and the tungsten-impregnated titania. In the ball mill, pulverizing and mixing were carried out for 2 hours until 2–3 $\mu$m particles amounted to about 50 vol %.

Thereafter, the mixture was filter pressed under 15 kg/cm², dried at 120° C. for 24 hours, and grinded. Next, calcination was carried out at 450° C. for 3 hours to give a catalyst in the powder form, which is referred to as "Catalyst A".

The dioxin-removal performance of the prepared catalyst was compared with that of a catalyst commonly used in incinerators (Integral Company; Dedioxin Catalyst), which is referred to as "Catalyst B". The comparison experiments were divided into $NO_x$ removal and dioxin removal, taking notice that generally most dioxin-removing catalyst may be used as $NO_x$ removing catalyst. $NO_x$ removal experiment was conducted by use of the catalysts of 20–30 mesh under severe conditions of GHSV=100,000/hr in the presence of 500 ppm NO and 500 ppm $NH_3$, and removal efficiencies of nitrogen oxides of Catalysts A and B were compared at a temperature range of 150–500° C., respectively. The dioxin removal experiment, verifying oxidation properties of dioxin, was carried out under severe conditions of GHSV=60,000/hr in the presence of PCE=30 ppm, using the same catalysts forms and temperature conditions as $NO_x$ removal experiment. In dioxin removal, PCDD and PCDF as dioxin compounds were too dangerous to use in the experiment. Accordingly, Use was made of a common precursor of such dioxin compounds, PCE (perchloro ethylene), which has been utilized in most laboratories and industries to measure dioxin removal efficiency of the catalyst. Contents of main metal components in the Catalysts A and B and said experiment results are given in Table 1, below.

TABLE 1

| Catalyst | Components (wt %) | | | | | | PCE Removal Performance | | $NO_x$ Removal Performance | |
|---|---|---|---|---|---|---|---|---|---|---|
| | V | Ni | Mo | W | Ti | Al | Temp. (° C.) | Removal (%) | Temp. (° C.) | Removal (%) |
| A | 3.6 | 1.1 | 1.0 | 5.9 | 42.5 | 6.6 | 300 | 95 | 300 | 98 |
| B | 4.4 | — | — | 5.9 | 43.4 | 1.3 | 300 | 75 | 300 | 92 |

As can be seen in the above table, Catalyst A of the present invention is improved by about 20% in PCE oxidation and by 6% in $NO_x$ removal compared with the conventional Catalyst B.

EXAMPLE 2

Activities and Properties of Dioxin-Removing Catalyst (2)

A dioxin-removing Catalyst A of the present invention prepared in Example 1 and the conventional dedioxin Catalyst B were tested for their oxidization of o-DCB (o-dichlorobenzene), a precursor generally used in the dioxin-removing experiment instead of PCE. 1 g of each of Catalysts A and B of 20–30 mesh were measured for their removal performance under severe conditions of GHSV= 60,000/hr in the presence of o-DCB=30 ppm. The results are shown in Table 2, below.

TABLE 2

| CATALYST | Components (wt %) | | | | | | PCE Removal Performance | | | |
| --- | --- | --- | --- | --- | --- | --- | --- | --- | --- | --- |
| | V | Ni | Mo | W | Ti | Al | Temp. (°C.) | Removal (%) | Temp. (°C.) | Removal (%) |
| A | Same as in Example 1 | | | | | | 320 | 90 | 350 | 95 |
| B | Same as in Example 1 | | | | | | 320 | 78 | 350 | 82 |

From the result of the table 2, it is found that a dioxin-removal catalyst of the present invention is improved by about 12–13% in o-DCB oxidation compared with the conventional catalyst.

Therefore, a catalyst of the present invention has superior removal effect of dioxin to that of conventional catalyst, which results from the adjustment of active metal components and the formation of composite pore structures. Also, because a spent catalyst discharged from oil refinery is used, raw materials for the catalyst can be easily obtained and thus a preparation cost becomes low.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A catalyst for removing dioxin, comprising 1–10 wt % of vanadium, 0.1–5 wt % of nickel, 0.1–5 wt % of molybdenum and 1–15 wt % of tungsten, on a mixture support consisting essentially of 10–50 wt % of alumina and 50–90 wt % of titania.

2. A method for preparing the dioxin removal catalyst according to claim 1, comprising the following steps of:
  a) pretreating a spent catalyst discharged from a hydrodesulfurization process of an oil refinery, which comprises 5–30 wt % of vanadium, 1–10 wt % of nickel, 1–10 wt % of molybdenum, 0.1–5 wt % of iron, 1–10 wt % of sulfur, 0.1–5 wt % of silicon and 0.1–5 wt % of a phosphorus component on an alumina support, by thermally treating said spent catalyst followed by washing with water;
  b) providing a titania support impregnated with 1 to 20 wt % of tungsten;
  c) homogeneously mixing the pretreated spent catalyst with the tungsten-impregnated titania under the addition of water and acid;
  d) dehydrating the mixture to remove active metal components present in excess of the compositional range required for said dioxin removal catalyst as well as excess moisture;
  e) drying the dehydrated mixture, followed by grinding the dried mixture; and
  f) forming a catalyst body by extruding the ground mixture or coating the ground mixture to a structure, followed by drying and then calcining the dried structure to form a catalyst body.

3. The method as defined in claim 2, wherein the thermal treatment of step a) is carried out at 300–400° C. for 3–5 hours.

4. The method as defined in claim 2, wherein the tungsten impregnated titania has a specific surface area of 60–100 m²/g and pore sizes of 150–200 A, and has an anatase crystalline structure.

5. The method as defined in claim 2, wherein the alumina support in the spent catalyst is a gamma alumina support, and has a specific surface area of 40–100 m²/g and pore sizes of 150–300 A.

6. The method as defined in claim 2, wherein the acid is oxalic acid or citric acid and is added in an amount of 3 to 7 wt % based on the spent catalyst and the tungsten impregnated titania in the c) step.

7. The method as defined in claim 2, the c) step is carried out in a ball mill until particles having a size of 2–3 μm amount to 4–60 volume % based on the total volume of particles in the mixture.

8. The method as defined in claim 2, wherein the spent catalyst and the tungsten-impregnated titania are mixed at weight ratio of 10:90–50:50 in the c) step.

9. The method as defined in claim 2, wherein the d) step is carried out using a filter press under a pressure of 10–15 kg/cm².

10. The method as defined in claim 2, wherein the e) step is conducted using a continuous dryer-miller.

11. The method as defined in claim 2, wherein the drying of the step e) is carried out at 80–120° C. for 0.5–2 hours.

12. The method as defined in claim 2, wherein the drying of the f) step is carried out using a hot blast dryer, a microwave dryer or a thermohydrostat at 60–120° C. for 3–48 hours.

13. The method as defined in claim 2, wherein the calcining of the step f) is carried out at 450–550° C. for 3–5 hours.

14. The method as defined in claim 2, wherein the extruding comprises dry-mixing the ground mixture with organic binders, inorganic binders and glass fiber; aging the dry mixture, together with water, plasticizers, lubricants and dispersants, at 5° C. or lower for 1–2 days; kneading the aged mixture in a kneader 2–5 times; storing said kneaded mixture at 5° C. or lower for 1–5 days; and molding the stored mixture into a honeycomb form through a vacuum extruder.

15. The method as defined in claim 2, wherein the coating comprises applying, pouring or pressure-adhering a coating material including the ground mixture, inorganic binders and water to a metal plate of honeycomb form or a cordierite-typed ceramic honeycomb.

* * * * *